US012675255B2

(12) United States Patent
Thirumaleshwara et al.

(10) Patent No.: US 12,675,255 B2
(45) Date of Patent: Jul. 7, 2026

(54) APPARATUS AND METHODS FOR ENHANCED DIGITAL AUDIO BUS RELIABILITY

(71) Applicant: Analog Devices International Unlimited Company, County Limerick (IE)

(72) Inventors: Prasanna Thirumaleshwara, Kasargod (IN); Pranav Balakrishnan, Bengaluru (IN); Eric Cline, Lowell, MA (US); Miguel Chavez, Cambridge, MA (US)

(73) Assignee: Analog Devices International Unlimited Company, County Limerick (IE)

( * ) Notice: Subject to any disclaimer, the term of this patent is extended or adjusted under 35 U.S.C. 154(b) by 147 days.

(21) Appl. No.: 18/899,191

(22) Filed: Sep. 27, 2024

(65) Prior Publication Data

US 2025/0110687 A1     Apr. 3, 2025

Related U.S. Application Data

(60) Provisional application No. 63/586,083, filed on Sep. 28, 2023.

(51) Int. Cl.
*G06F 3/16* (2006.01)

(52) U.S. Cl.
CPC .................................. *G06F 3/162* (2013.01)

(58) Field of Classification Search
CPC ........ G06F 3/162; G06F 13/4247; H04R 3/12
See application file for complete search history.

(56) References Cited

U.S. PATENT DOCUMENTS

| | | | |
|---|---|---|---|
| 8,990,464 | B2 | 3/2015 | Kessler |
| 9,059,724 | B2 | 6/2015 | Lahr et al. |
| 9,197,226 | B2 | 11/2015 | Lahr |
| 9,417,944 | B2 | 8/2016 | Kessler |
| 9,448,959 | B2 | 9/2016 | Hooper et al. |
| 9,772,665 | B2 | 9/2017 | Patterson |
| 9,875,152 | B2 | 1/2018 | Kessler |
| 9,946,679 | B2 | 4/2018 | Chavez et al. |
| 9,946,680 | B2 | 4/2018 | Chavez et al. |
| 10,250,376 | B2 | 4/2019 | Hooper et al. |
| 10,269,343 | B2 | 4/2019 | Wingate |
| 10,311,010 | B2 | 6/2019 | Kessler et al. |

| | | | |
|---|---|---|---|
| 10,397,021 | B2 * | 8/2019 | Kessler ............. H04L 12/40058 |
| 10,649,948 | B2 | 5/2020 | Kessler et al. |
| 10,872,049 | B2 | 12/2020 | Kessler et al. |
| 10,964,306 | B2 | 3/2021 | Mortensen et al. |
| 11,238,004 | B2 | 2/2022 | Kessler et al. |
| 11,874,791 | B2 | 1/2024 | Kessler et al. |
| 2003/0223409 | A1 * | 12/2003 | Wiebe ...................... H04J 3/22 370/352 |
| 2014/0025999 | A1 | 1/2014 | Kessler |
| 2016/0277288 | A1 | 9/2016 | Maruyama et al. |
| 2017/0041153 | A1 | 2/2017 | Picard et al. |
| 2017/0070821 | A1 | 3/2017 | Arknaes-Pedersen |
| 2023/0344673 | A1 | 10/2023 | Thirumaleshwara et al. |
| 2023/0370311 | A1 | 11/2023 | Kessler et al. |
| 2023/0396504 | A1 | 12/2023 | Madegowda et al. |
| 2023/0403179 | A1 | 12/2023 | Tarkoff et al. |
| 2024/0004446 | A1 | 1/2024 | Kessler et al. |
| 2024/0378011 | A1 | 11/2024 | Thirumaleshwara et al. |

FOREIGN PATENT DOCUMENTS

| | | |
|---|---|---|
| JP | 2007-259347 A | 10/2007 |
| JP | 2009-527952 A | 7/2009 |
| JP | 2015-103978 A | 6/2015 |
| WO | WO 2022/087076 A1 | 4/2022 |

OTHER PUBLICATIONS

Office Action with Translation issued in Japanese Patent Application No. 2024-167474, dated Oct. 14, 2025.
Notice of Allowance for Japanese Patent Application No. 2024-167474 dated on Mar. 17, 2026 in 3 pages.
Extended European Search Report issued for Application No. 24202688.8 dated Feb. 19, 2025 in 5 pages.

* cited by examiner

*Primary Examiner* — Phung-Hoang J Nguyen
(74) *Attorney, Agent, or Firm* — Knobbe, Martens, Olson & Bear, LLP

(57) ABSTRACT

Apparatus and methods digital audio bus reliability are disclosed. In certain embodiments, a digital audio system includes a plurality of audio devices connected by a first digital audio chain in a clockwise direction and a second digital audio chain in a counterclockwise direction. The first digital audio chain and the second digital audio chain run concurrently, and a controller selects which audio chain to operate at a given time for audio connectivity. For example, the controller can initially select the first digital audio chain to provide audio connectivity, but transition selection from the first digital audio chain to the second digital audio chain in response to detecting a node failure in the first digital audio chain. Thus, the system is tolerant to node failures while maintaining system connectivity.

18 Claims, 6 Drawing Sheets

Physical Connections

Node Drop @ Sub 1

Sub 1 Bypassed

APPARATUS AND METHODS FOR ENHANCED DIGITAL AUDIO BUS RELIABILITY

INCORPORATION BY REFERENCE TO ANY PRIORITY APPLICATIONS

The present application claims priority to U.S. Provisional Patent Application No. 63/586,083, filed Sep. 28, 2023, and titled "APPARATUS AND METHODS FOR ENHANCED DIGITAL AUDIO BUS RELIABILITY," the entirety of which is hereby incorporated herein by reference.

FIELD OF THE DISCLOSURE

The disclosed technology relates generally to electronics, and more particularly to digital audio buses.

BACKGROUND

An A to B bus (A2B) can be used to connect multiple audio devices together. For example, each of the audio devices can be associated with an audio node, and the A2B can connect the audio nodes in series to form a daisy chain. By using A2B in this manner, a significant reduction in cabling runs can be realized. Thus, overall design costs are reduced due to the need for fewer cables. Moreover, a reduction in complexity in design, installation and/or maintenance can be achieved.

SUMMARY OF THE DISCLOSURE

Aspects of the present disclosure relate to a digital audio bus, such as an A to B bus (A2B), that is implemented with redundancy to improve network reliability. Providing such redundancy addresses inherent limitations of A2B's daisy chain topology such as susceptibility to a single node failure.

In one aspect, a digital audio system includes a plurality of audio nodes each associated with a corresponding audio device, a first digital audio chain connecting the plurality of audio nodes, and a second digital audio chain connecting the plurality of audio nodes. The first digital audio chain and the second digital audio chain run concurrently, and at least one of the plurality of audio nodes includes a controller configured to select one of the first digital audio chain or the second digital audio chain for audio connectivity.

In another aspect, a method of providing digital audio connectivity includes connecting a plurality of audio nodes using a first digital audio chain, the plurality of audio nodes each associated with a corresponding audio device. The method further includes connecting the plurality of audio nodes using a second digital audio chain, running the first digital audio chain and the second digital audio chain concurrently, and selecting one of the first digital audio chain or the second digital audio chain for audio connectivity using a controller of at least one of the plurality of audio nodes.

In another aspect, a digital audio system includes a plurality of audio sub-nodes, and a main audio node including a plurality of audio sub-node selectors each connected to a corresponding one of the plurality of audio sub-nodes. The main audio node further includes a main transceiver configured to communicate with the plurality of audio sub-nodes in a chain through the plurality of audio sub-node selectors.

In another aspect, a method of providing digital audio connectivity includes connecting a main audio node and a plurality of audio sub-nodes using a plurality of audio sub-node selectors of the main audio node, each of the plurality of audio sub-node selectors connected to a corresponding one of the plurality of audio sub-nodes. The method further includes communicating with the plurality of audio sub-nodes in a chain through the plurality of audio sub-node selectors using a main transceiver of the main node.

DETAILED DESCRIPTION

Figure 1A:
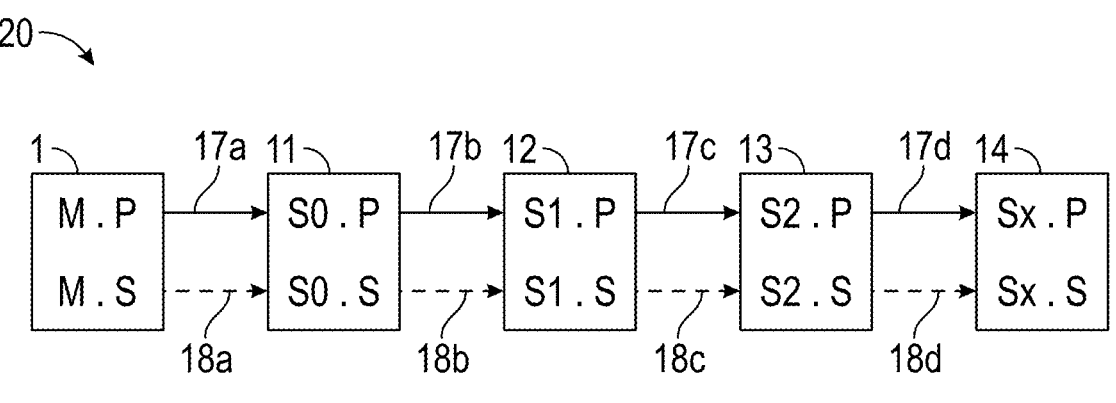
FIG. 1A is a schematic diagram of a digital audio system including a digital audio bus according to one embodiment.

The following detailed description of embodiments presents various descriptions of specific embodiments of the invention. However, the invention can be embodied in a multitude of different ways. In this description, reference is made to drawings. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

An A to B bus (A2B) can be used to connect multiple audio devices together in a daisy chain. However, the daisy chain topology of A2B is susceptible to reliability issues. For example, the loss of one audio node in the daisy chain (for instance, due to a faulty node and/or a cable disconnection) can disrupt the operation of multiple audio nodes downstream. Furthermore, the scope for partial recovery and/or auto recovery in these circumstances is highly limited.

Such reliability issues render a daisy-chained A2B unfit for high reliability audio applications including, but not limited to, live performances, on-stage audio connectivity, building alarm and security, emergency announcement, and/or mission critical conferencing. As A2B expands beyond automotive, a need for plug-n-play with tolerance to a single node failure is desired, particularly for professional audio systems.

Aspects of the present disclosure relate to a digital audio bus, such as an A to B bus (A2B), that is implemented with redundancy to improve network reliability. Providing such redundancy addresses inherent limitations of A2B's daisy chain topology such as susceptibility to a single node failure.

In one aspect, a digital audio system includes a plurality of audio devices connected by a first digital audio chain in a clockwise direction and a second digital audio chain in a counterclockwise direction. The first digital audio chain and the second digital audio chain run concurrently, and a controller selects which audio chain to operate at a given time for audio connectivity. For example, the controller can initially select the first digital audio chain to provide audio connectivity, but transition selection from the first digital audio chain to the second digital audio chain in response to detecting a node failure in the first digital audio chain. Thus, the system is tolerant to node failures while maintaining system connectivity.

Such a configuration includes two semi-rings (a clockwise semi-ring and a counterclockwise semi-ring), which can communicate over a common cable to reduce cable and connector costs. In one example, the first digital audio chain is communicated over a first twisted pair of a cable (for example, a Cat5 cable), while the second digital audio chain is communicated over a second twisted pair of the cable.

In another aspect, a digital audio system is implemented using a pseudo hub. Such a configuration can take advantage of a star topology while maintaining the physical requirements of a daisy chain. The number of connectors can be reduced by merging A and B ports. Additionally, the main node can intelligently decide to exclude or include an audio sub-node in the network using a corresponding audio sub-node selector.

Embodiments of the disclosure can be implemented in various electronic devices and applications, such as those associated with professional audio, musical instrument connectivity, and next generation automotive. Examples of the electronic devices can include, but are not limited to, consumer electronic products, audio equipment, automotive equipment, etc.

FIG. 1A is a schematic diagram of a digital audio system 20 including a digital audio bus according to one embodiment. The digital audio system 20 includes a main audio node 1, a first audio sub-node 11, a second audio sub-node 12, a third audio sub-node 13, and a fourth audio sub-node 14.

In the illustrated embodiment, each of the main audio node 1 and the audio sub-nodes 11-14 are associated with an audio device, such as a musical instrument, a speaker, a microphone, an audio amplifier, an audio mixer, or other device that is compliant with the digital audio standard (for instance, A2B compliant). Although an example with four audio sub-nodes is shown, the main audio node 1 can be connected to more or fewer audio sub-nodes (for instance, an x number of sub-nodes, where x is a positive integer).

To provide audio connectivity between the nodes (and thus between the corresponding audio devices), a first daisy chain and a second daisy chain have been included to connect each of the nodes. For example, the first or primary daisy chain 17a-17d includes a first section or link 17a between the main audio node 1 and the first audio sub-node 11, a second link 17b between the first audio sub-node 11 and the second audio sub-node 12, a third link 17c between the second audio sub-node 12 and the third audio sub-node 13, and a fourth link 17d between the third audio sub-node 13 and the fourth audio sub-node 14. Additionally, the second or secondary daisy chain 18a-18d includes a first link

18a between the main audio node 1 and the first audio sub-node 11, a second link 18b between the first audio sub-node 11 and the second audio sub-node 12, a third link 18c between the second audio sub-node 12 and the third audio sub-node 13, and a fourth link 18d between the third audio sub-node 13 and the fourth audio sub-node 14.

For an A2B implementation, each daisy chain section can be implemented as a twisted pair cable serving as a bi-directional data bus that supports multiple channel audio with low jitter and latency.

Each of the audio nodes can include a controller, such as a microcontroller unit (MCU) and/or a digital signal processor (DSP), that monitors the signaling conditions on the primary daisy chain 17a-17d and secondary daisy chain 18a-18d. Additionally, when a failure in the primary daisy chain 17a-17d is detected, the controller can switch from communicating audio data over the primary daisy chain 17a-17d to communicating audio data over the secondary daisy chain 18a-18d. Further, the controller can switch selection of the daisy chain while also ensuring a smooth transition of an audio clock.

In the illustrated embodiment, the primary daisy chain 17a-17d and the secondary daisy chain 18a-18d can each have identical configurations, and thus there is no need for a fresh discovery (for instance, of audio nodes) when transitioning from one daisy chain to another. Further, power can be drawn by each node from either the primary daisy chain 17a-17d or the secondary daisy chain 18a-18d. Thus, if one network goes off the load can be transitioned to be powered by the second network.

The digital audio system 20 of FIG. 1A is fault tolerant to a faulty cable or a cable disconnection, but not fault tolerant when an entire audio device associated with a node is dropped from the network (for example, due to complete device failure).

In certain implementations, each link of each daisy chain is associated with a separate cable (for example, a cable including a twisted pair) that plugs at each end into corresponding connectors of the audio nodes. In such an implementation, the depicted digital audio system 20 could include 4 cables for each daisy chain, 2 connectors for the main audio node 1, and 4 connectors for each of the audio sub-nodes. Additionally, each node can include two transceivers, one for communicating over each daisy chain.

However, other implementations are possible, such as configurations in which the connections for both daisy chains between adjacent audio nodes are provided over a single cable. For example, certain cables, such as Cat5 cables, carry multiple twisted pairs.

Figure 1B:
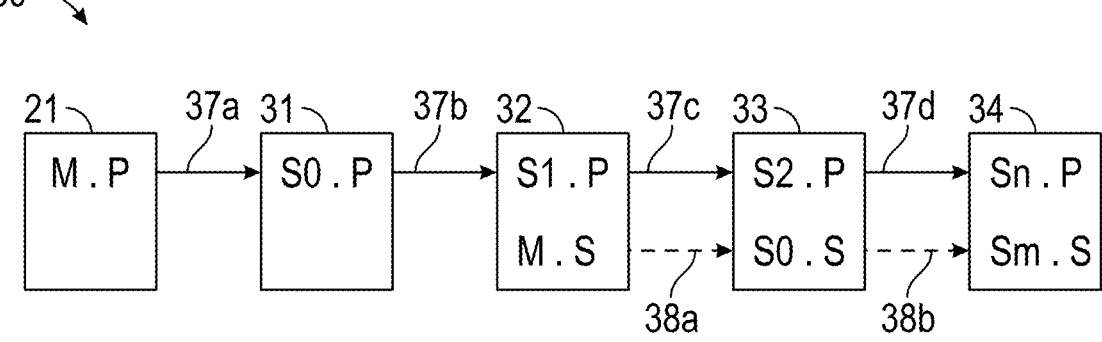
FIG. 1B is a schematic diagram of a digital audio system including a digital audio bus according to another embodiment.

FIG. 1B is a schematic diagram of a digital audio system 30 including a digital audio bus according to another embodiment. The digital audio system 30 includes a main audio node 21, a first audio sub-node 31, a second audio sub-node 32, a third audio sub-node 33, and a fourth audio sub-node 34.

To provide audio connectivity between the nodes, a first daisy chain and a second daisy chain have been included for connecting the audio nodes. For example, a primary daisy chain 37a-37d includes a first link 37a between the main audio node 21 and the first audio sub-node 31, a second link 37b between the first audio sub-node 31 and the second audio sub-node 32, a third link 37c between the second audio sub-node 32 and the third audio sub-node 33, and a fourth link 37d between the third audio sub-node 33 and the fourth audio sub-node 34. Additionally, the secondary daisy chain 38a-38b includes a first link 38a between the second audio sub-node 32 and the third audio sub-node 33, and a second link 38*b* between the third audio sub-node 33 and the fourth audio sub-node 34.

The digital audio system 30 of FIG. 1B is similar to the digital audio system 20 of FIG. 1A, except that the digital audio system 30 of FIG. 1B employs branching from one daisy chain to two daisy chains at the second audio sub-node 32. Such a configuration can be suitable for applications in which a main audio node and one or more audio sub-nodes can be assumed to be robust and thus not subject to node dropping or disconnect.

In the illustrated example, the primary daisy chain includes four links and the secondary daisy chain includes two links. However, the primary daisy chain and/or the secondary chain can be associated with more or fewer links (for instance, an n number of sub-nodes for the primary daisy chain and an m number of sub-nodes for the secondary daisy chain, where m and n are positive integers and n>m).

Figure 2:
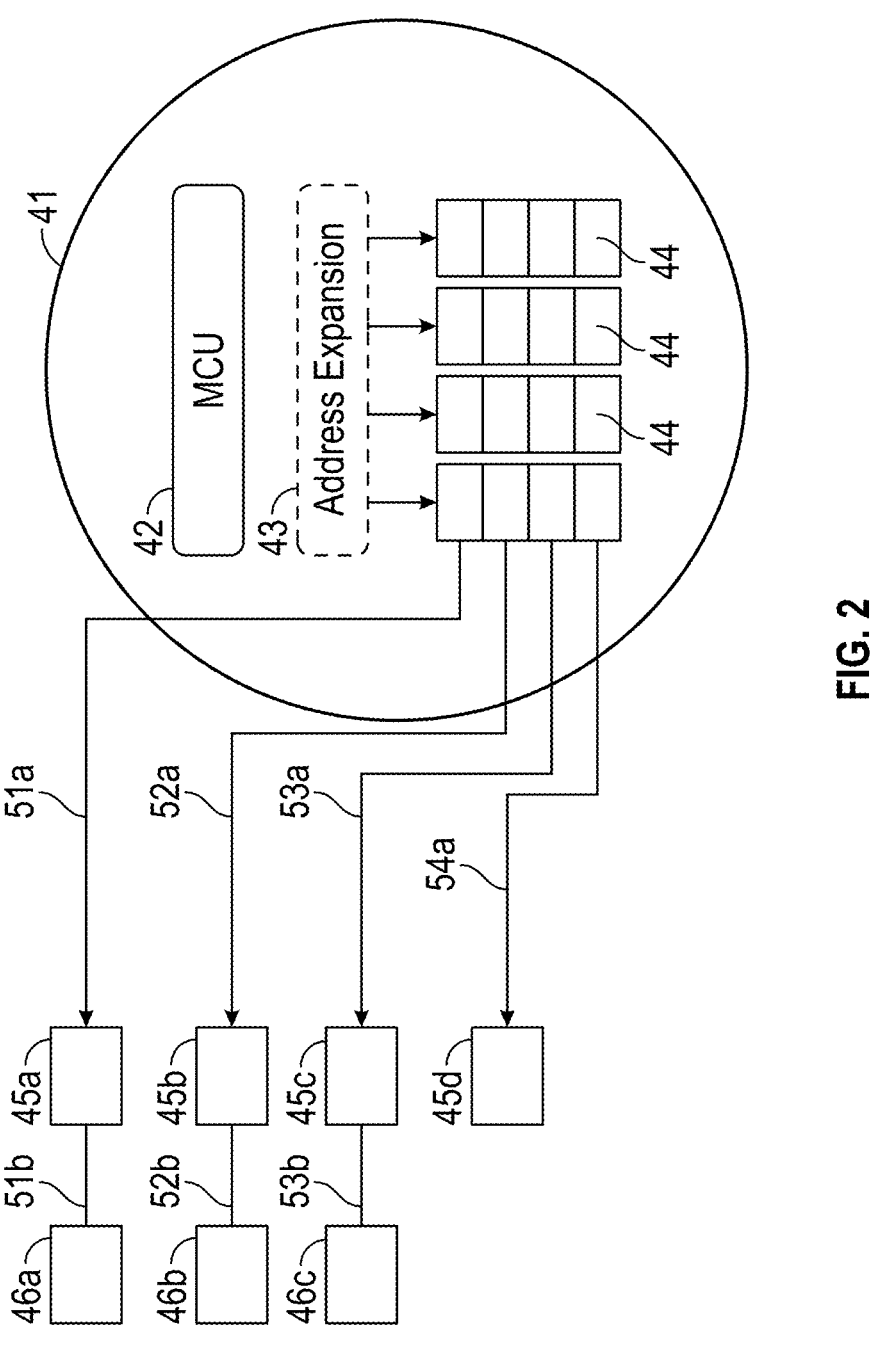
FIG. 2 is a schematic diagram of a digital audio system including a digital audio bus according to another embodiment.

FIG. 2 is a schematic diagram of a digital audio system 50 including a digital audio bus according to another embodiment. The digital audio bus 50 includes a main audio node 41 including a controller (corresponding to MCU 42, in this example), a memory 43 storing an address expansion, and connectors 44. The digital audio bus 50 includes first audio sub-nodes 45*a*/45*b*/45*c*/45*d*, second audio sub-nodes 46*a*/46*b*/46*c*, and various daisy chains for connecting the audio sub-nodes.

For example, a first daisy chain 51*a*-51*b* includes a first link 51*a* between the main audio node 41 and the first audio sub-node 45*a* and a second link 51*b* between the first audio sub-node 45*a* and the second audio sub-node 46*a*. Additionally, a second daisy chain 52*a*-52*b* includes a first link 52*a* between the main audio node 41 and the first audio sub-node 45*b* and a second link 52*b* between the first audio sub-node 45*b* and the second audio sub-node 46*b*. Furthermore, a third daisy chain 53*a*-53*b* includes a first link 53*a* between the main audio node 41 and the first audio sub-node 45*c* and a second link 53*b* between the first audio sub-node 45*c* and the second audio sub-node 46*c*. Additionally, a link 54*a* connects the main audio node 41 and the audio sub-node 45*d*.

Thus, various daisy chains extend in a star configuration from the main audio node 41. The daisy chains can each be of any length. Thus, certain daisy chains are depicted as including two audio sub-nodes, but more or fewer audio sub-nodes can be included in each chain.

The depicted configuration can be relatively robust when fault tolerance is provided for the main node 41. Further, each audio sub-node can operate with two or fewer connectors, which achieves simplicity. Moreover, the audio sub-nodes can operate with a need for soft switches.

However, downstream audio sub-nodes in each daisy chain can still fail and the main node 41 suffers from bulkiness due to high cabling cost and/or a large number of connectors. Thus, the main node 41 may be suitable for certain audio devices, such as professional audio mixers, but may but unsuitable for smaller peripherals.

Figure 3A:
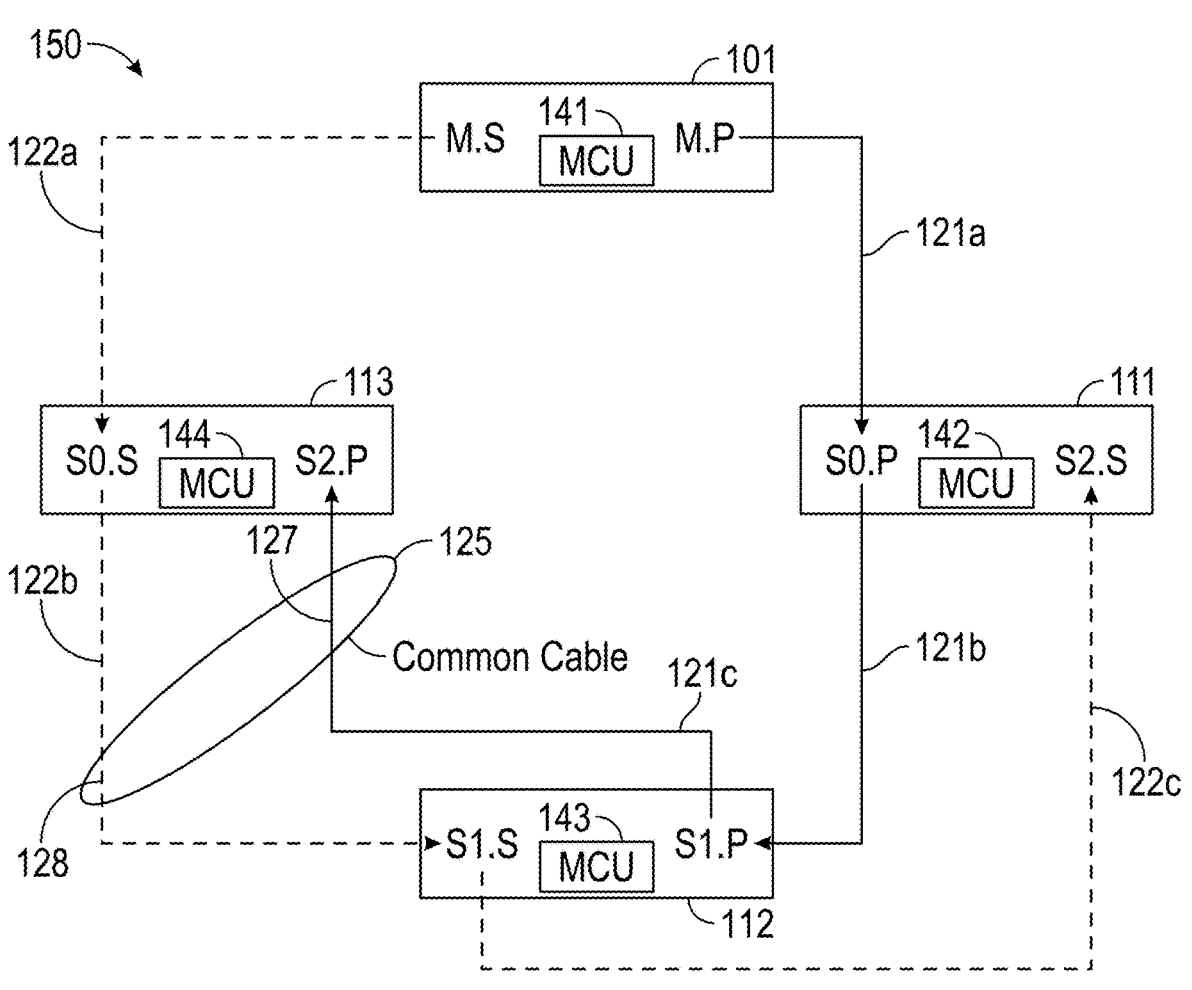
FIG. 3A is a schematic diagram of a digital audio system including a digital audio bus according to another embodiment.

FIG. 3A is a schematic diagram of a digital audio system 150 including a digital audio bus according to another embodiment. The digital audio system 150 includes a main audio node 101, a first audio sub-node 111, a second audio sub-node 112, and a third audio sub-node 113. The main audio node 101 includes an MCU 141, the first audio sub-node 111 includes an MCU 142, the second audio sub-node 112 includes an MCU 143, and the third audio sub-node 113 includes an MCU 144.

In the illustrated embodiment, each of the main audio node 101 and the audio sub-nodes 111-113 are associated with an audio device, such as a musical instrument, a speaker, a microphone, an audio amplifier, an audio mixer, or other device that is compliant with a digital audio standard (for instance, A2B compliant, in some embodiments). Although an example with three audio sub-nodes is shown, more or fewer audio sub-nodes can be included.

Further, while certain components of an audio node are depicted, the audio nodes can include additional components. For example, the audio nodes can include any combination of components herein. Such features are omitted from the drawing of FIG. 3A for clarity of the figure.

To provide audio connectivity between the nodes (and thus between the corresponding audio devices), a first digital audio chain (daisy chain) and a second digital audio chain have been included to connect each of the nodes. For example, the first digital audio chain 121*a*-121*c* includes a first section or link 121*a* between the main audio node 101 and the first audio sub-node 111, a second link 121*b* between the first audio sub-node 111 and the second audio sub-node 112, and a third link 121*c* between the second audio sub-node 112 and the third audio sub-node 113. Additionally, the second digital audio chain 122*a*-122*c* includes a first link 122*a* between the main audio node 101 and the third audio sub-node 113, a second link 122*b* between the third audio sub-node 113 and the second audio sub-node 112, and a third link 122*c* between the second audio sub-node 112 and the first audio sub-node 111.

In certain implementations, each section of the digital audio chains between a pair of nodes is implemented over a common cable. For example, the link 121*c* of the first digital audio chain and the link 122*b* of the second digital audio chain can be carried on a common cable 125 that includes a first twisted pair 127 for the link 121*c* and a second twisted pair 128 for the link 122*b*. One example of a suitable cable with multiple twisted pairs is a Cat5 cable.

Each of the audio nodes can include a controller (for example, an MCU in this example) that monitors the signaling conditions on the first digital audio chain 121*a*-121*c* and the second digital audio chain 122*a*-122*c*. Additionally, when a failure in the first daisy chain 121*a*-121*c* is detected, the controller can switch from communicating audio data over the first digital audio chain 121*a*-121*c* to communicating audio data over the second digital audio chain 122*a*-122*c*.

In the illustrated embodiment, the first digital audio chain 121*a*-121*c* connects the audio nodes in a clockwise direction, while the second digital audio chain 122*a*-122*c* connects the audio nodes in a counterclockwise direction. The first digital audio chain 121*a*-121*c* and the second digital audio chain 122*a*-122*c* run concurrently, and a controller (MCU, in this example) for each node selects which audio chain to operate at a given time for audio connectivity.

For example, the controller can initially select the first digital audio chain 121*a*-121*c* to provide audio connectivity, but transition selection from the first digital audio chain 121*a*-121*c* to the second digital audio chain 122*a*-122*c* in response to detecting a node failure in the first digital audio chain 121*a*-121*c*. Thus, the system is tolerant to node failures while maintaining system connectivity.

In certain implementations, each of the depicted nodes is part of two networks (for example, two A2B networks), one associated with the first digital audio chain 121*a*-121*c* and the other associated with the second digital audio chain 122*a*-122*c*. Additionally, each node can access audio data from both directions. Further, the audio nodes of the first digital audio chain 121*a*-121*c* are discovered in a clockwise direction, while the audio nodes of the second digital audio chain 122a-122c are discovered in a counterclockwise direction (and thus in a direction opposite that of the first digital audio chain 121a-121c).

Such a configuration includes two semi-rings (a clockwise semi-ring and a counterclockwise semi-ring), which can communicate over a common cable (for example, the common cable 125) between adjacent nodes to reduce cable and connector costs.

In certain implementations, the digital audio system 150 is an A2B system. Additionally, the main audio node 101 includes a separate B port for the first digital audio chain 121a-121c and for the second digital audio chain 122a-122c and can maintain a common stream configuration for each chain.

Figure 3B:
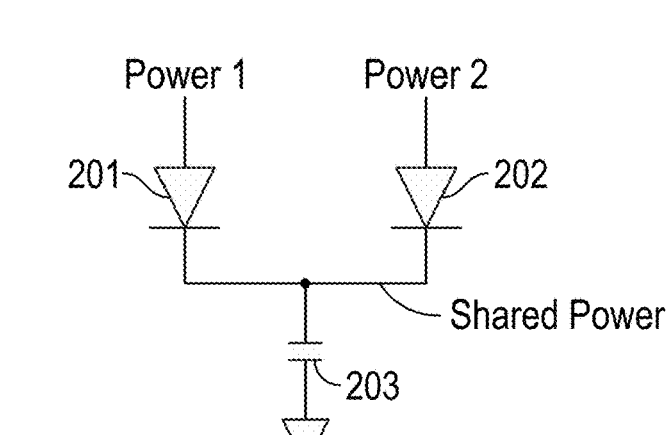
FIG. 3B is a schematic diagram of a power sharing circuit for a digital audio bus according to one embodiment.

FIG. 3B is a schematic diagram of a power sharing circuit 210 for a digital audio bus according to one embodiment. The power sharing circuit 210 includes a first rectifier 201, a second rectifier 202, and a capacitor 203.

The power sharing circuit 210 of FIG. 3B depicts an example of a circuit that can be included as part of an audio sub-node to receive power from two different digital audio chains. Additionally, when power is lost for one of the digital audio chains, operation of the audio sub-node can continue without disruption.

For example, the first rectifier 201 includes an anode connected to a first power source (Power 1) from a first digital audio chain and a cathode connected to the capacitor 203. Additionally, the second rectifier 202 includes an anode connected to a second power source (Power 2) from a second digital audio chain and a cathode connected to the capacitor 203. The capacitor 203 serves as a charge storage node for a shared power source that can be used to power one or more components of the audio sub-node.

When either the first power source (Power 1) or the second power source (Power 2) is active, the shared power source is operative for powering components of the audio sub-node. Accordingly, including a power sharing circuit, such as the power sharing circuit 210 of FIG. 3B, in one or more audio sub-nodes of an audio network can enhance the reliability of the network.

Figures 4A, 4B:
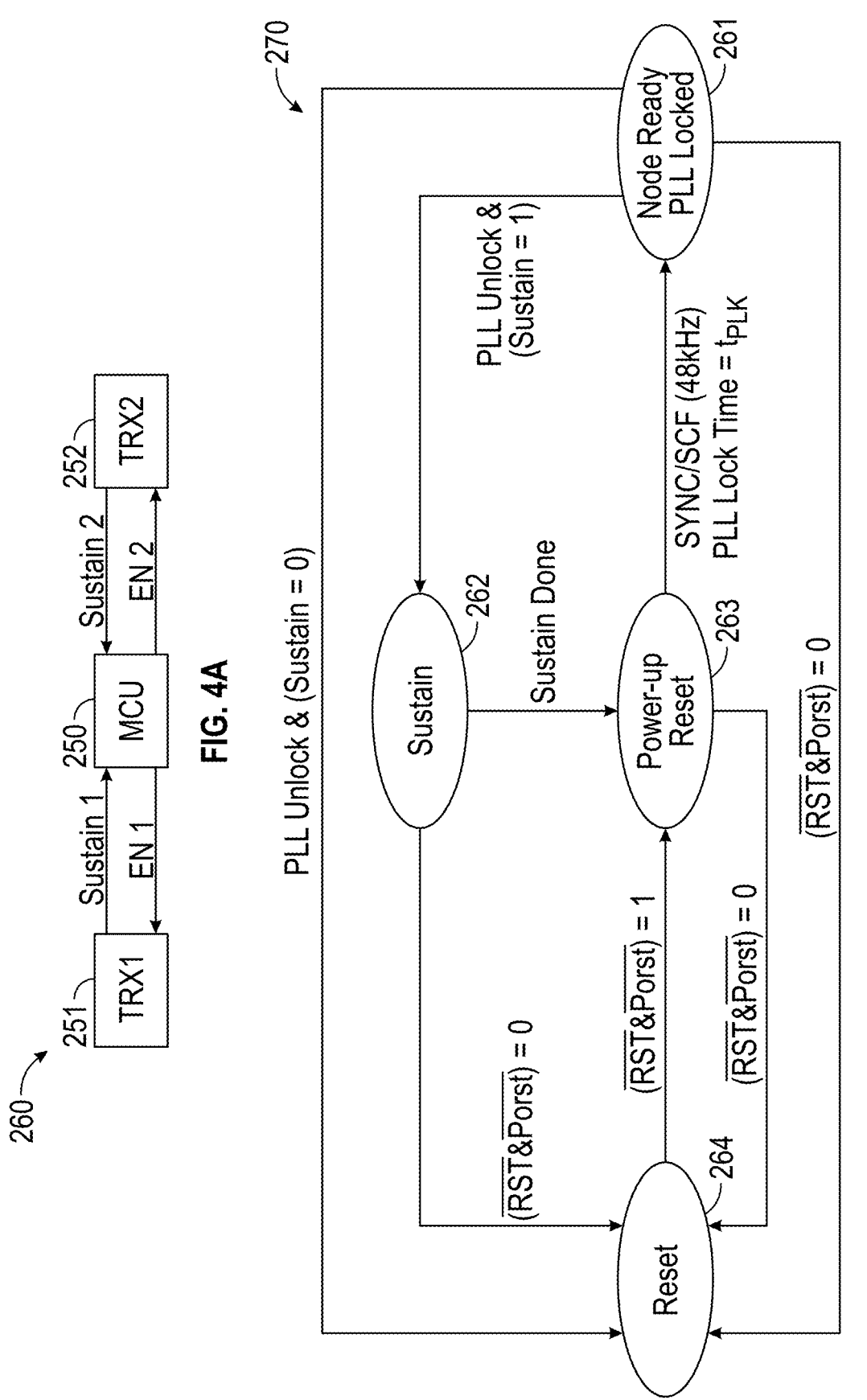
FIG. 4A is a schematic diagram of one embodiment of an audio node.
FIG. 4B is one embodiment of a state diagram for a transceiver of the audio node of FIG. 4A.

FIG. 4A is a schematic diagram of one embodiment of an audio node 260. The audio node 260 includes a first transceiver 251 (TRX1) for communicating over a first digital audio chain (daisy chain), a second transceiver 252 (TRX2) for communicating over a second digital audio chain, and a controller 250 (MCU, in this example) for selectively enabling communications over the first digital audio chain or the second digital audio chain. The audio node 260 can be implemented in the digital audio systems herein, such as in one or more of the audio nodes of FIG. 3. FIG. 4B is one embodiment of a state diagram 270 for a transceiver of the audio node 260 of FIG. 4A.

With reference to FIGS. 4A and 4B, a transceiver (for instance, TRX1 or TRX2) can operate in a node ready state 261 when an associated digital audio chain is operational. For example, the operational digital audio chain can be associated with active power, a locked phase-locked loop (PLL) for the audio clock, and/or other characteristics associated with the digital audio chain being running and otherwise operational.

However, when the PLL becomes unlocked, the transceiver can transition to a sustain state 262 when a sustain signal is active or to a reset state 264 when the sustain signal is inactive. From the sustain state 262, the transceiver can transition to a power-up reset state 263 (when sustain is done) or to a reset state 264 under certain logic conditions of a reset signal (RST) and power-on-reset signal (Porst).

From the power-up reset state 263, the transceiver can transition back to the node ready state 261 when the PLL resumes lock. Various other state transitions to and from the reset state 264 and power-up reset state 263 are depicted based on various logic conditions of RST and Porst.

As shown in FIG. 4A, the controller 250 detects the sustain state for TRX1 (Sustain 1) and the sustain state for TRX2 (Sustain 2) to determine when the first digital audio chain (associated with TRX1) is operational and when the second digital audio chain (associated with TRX2) is operational. Thus, the controller 250 can be ready to switch to a transceiver with stable clock as needed.

By implementing the audio node in this manner, a smooth transition from one digital audio chain to another digital audio chain is provided.

Figure 5A:
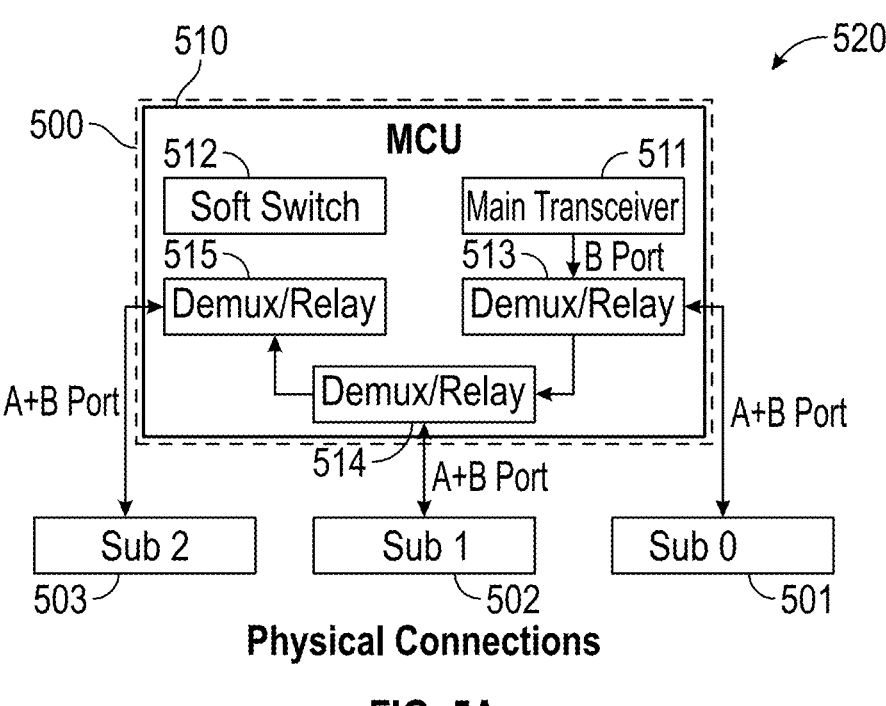
FIG. 5A is a schematic diagram of a digital audio system including a digital audio bus according to another embodiment.

FIG. 5A is a schematic diagram of a digital audio system 520 including a digital audio bus according to another embodiment.

The digital audio system 520 include a main audio node 500, a first audio sub-node 501, a second audio sub-node 502, and a third audio sub-node 503. Although an example with three audio sub-nodes is shown, the digital audio system 520 can include more or fewer audio sub-nodes as desired for a given application.

The main audio node 500, the first audio sub-node 501, the second audio sub-node 502, and the third audio sub-node 503 are connected to take advantage of a star topology while maintaining the physical requirements of A2B's daisy chain. Further, the main audio node 500 intelligently decides to include or exclude a particular sub-node in the network. The digital audio system 520 is also referred to herein as a pseudo-hub 520.

In the illustrated embodiment, the number of connectors is reduced by merging an A port and a B port of A2B. Thus, both the A port and the B port are merged to a single connector in this embodiment, and the same cable carries both upstream and downstream data.

As shown in FIG. 5A, the main audio node 500 includes various components including a controller 510 (corresponding to an MCU, in this example), a main transceiver 511, a soft switch 512, a first demultiplexing/relay (demux/relay) 513, a second demux/relay 514, and a third demux/relay 515.

With continuing reference to FIG. 5A, the first demux/relay 513 communicates with the first audio sub-node 501 over an A port or a B port (A+B port). Additionally, the first demux/relay 513 is in communication with the second demux/relay 514. Furthermore, the second demux/relay 514 communicates with the second audio sub-node 502 over A+B port. Additionally, the second demux/relay 514 is in communication with the third demux/relay 515. Furthermore, the third demux/relay 515 communicates with the third audio sub-node 503 over A+B port. The demux/relays 513-515 serve as audio node selectors.

The main audio node 500 and the audio sub-nodes 501-503 can communicate with one another using the depicted components. For example, the main transceiver 521 of the main audio node 500 is shown as transmitting audio data over the B port to the first demux/relay 513, which can provide the audio data to the first audio sub-node 501. Additionally, the first audio sub-node 501 can communicate with the second audio sub-node 502 by way of the first demux/relay 513 and the second demux/relay 514. Furthermore, the second audio sub-node 502 can communicate with the third audio sub-node 503 by way of the second demux/relay 514 and the third demux/relay 515.

Thus, the physical requirements of A2B's daisy chain can be achieved. However, as will be discussed further below with reference to FIGS. 5B and 5C, the main audio node 500 intelligently decides to include or exclude a particular sub-node in the network, thus taking advantage of a star topology.

One or more of the depicted components of the main audio node 500 can be implemented by and/or controlled by the controller 503. For example, the controller 503 can include data processing hardware and memory hardware that stores instructions (also known as computer programs, software, software applications or code) that when executed by the data processing hardware causes the data processing hardware to perform various operations for implementing the desired functions. In certain implementations, the audio sub-node selectors are implemented by controller 503.

Figure 5B:
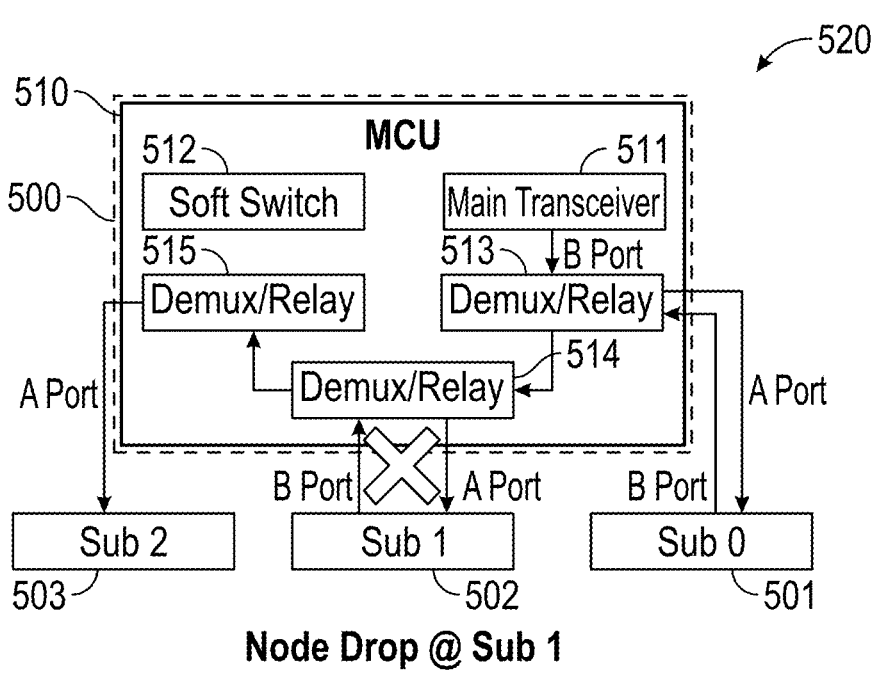
FIG. 5B is a schematic diagram of the digital audio system of FIG. 5A after a node drop.

FIG. 5B is a schematic diagram of the digital audio system 520 of FIG. 5A after a node drop. In this example, the second audio sub-node 502 has been dropped. Absent reconfiguration, the first demux/relay 513 can no longer transmit audio data to the first sub-node 502 through the second demux/relay 515 and the A port of the second audio sub-node 502. Further, the second audio sub-node 502 can no longer transmit data from the B port through the second demux/relay 514 to the third demux/relay 515.

Absent reconfiguration, the drop of the second audio sub-node 502 from the network will break the daisy chain and prevent the communication of audio data that would otherwise run through the second audio sub-node 502.

Figure 5C:
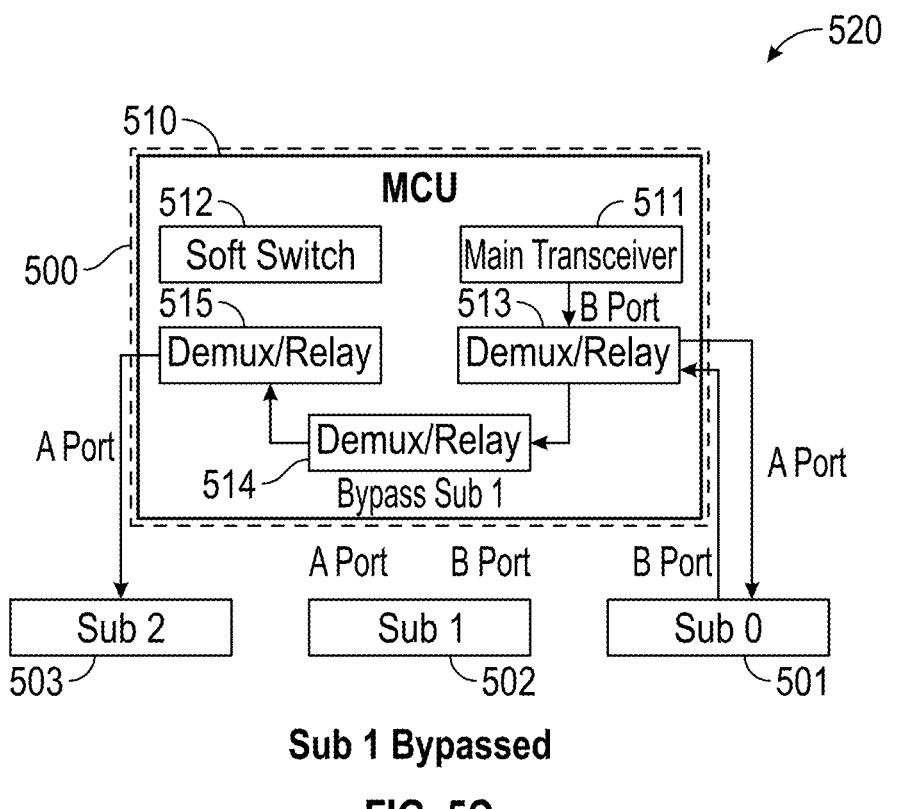
FIG. 5C is a schematic diagram of the digital audio system of FIG. 5A after reconfiguration to bypass the dropped node.

FIG. 5C is a schematic diagram of the digital audio system 520 of FIG. 5A after reconfiguration to bypass the dropped node.

The MCU 510 of the main audio node 500 has reconfigured the second demux/relay 514 to route data directly between the first demux/relay 513 to the third demux/relay 515. Accordingly, the second audio sub-node 502 has been effectively dropped from the network and daisy chain, even though the second audio sub-node 502 remains physically connected to the main audio node 500 by cable.

Thus, once the main audio node 500 detects a node drop, a bypass mode is activated to close connections and bypass the dropped node. During such a bypass, the remainder of the audio sub-nodes can be rediscovered and audio re-routed. Further, in certain implementations, the internal connections can be re-arranged such that the dropped node becomes downstream to the last active audio sub-node.

The digital audio system 520 of FIGS. 5A-5C is fault tolerant to a case of a faulty cable or cable disconnection and to a case of an audio device being removed from or failed in the network.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A digital audio system comprising:
a plurality of audio nodes each associated with a corresponding audio device;
a first digital audio chain connecting the plurality of audio nodes; and
a second digital audio chain connecting the plurality of audio nodes, the first digital audio chain and the second digital audio chain running concurrently,
wherein at least one of the plurality of audio nodes comprises a controller configured to select one of the first digital audio chain or the second digital audio chain for audio connectivity, wherein the first digital audio chain runs in a clockwise direction and the second digital audio chain runs in a counterclockwise direction.

2. The digital audio system of claim 1, wherein the first digital audio chain and the second digital audio chain are each an A2B daisy chain.

3. The digital audio system of claim 1, wherein the first digital audio chain is discovered in the clockwise direction and the second digital audio chain is discovered in the counterclockwise direction.

4. The digital audio system of claim 1, wherein the plurality of audio nodes includes a main audio node and two or more audio sub-nodes, wherein the first digital audio chain extends from the main node through the two or more audio sub-nodes, and wherein the second digital audio chain extends from the main node through the two or more audio sub-nodes.

5. The digital audio system of claim 4, wherein each of the two or more audio sub-nodes comprises a respective controller for selecting one of the first digital audio chain or the second digital audio chain for audio connectivity.

6. The digital audio system of claim 1, wherein the controller initially selects the first digital audio chain for providing audio connectivity, and transitions from the first digital audio chain to the second digital audio chain in response to detecting a node failure in the first digital audio chain.

7. The digital audio system of claim 1, wherein the at least one of the plurality of audio nodes receives power from a merged power supply merged from a first power supply of the first digital audio chain and a second power supply of the second digital audio chain.

8. The digital audio system of claim 7, further comprising a first rectifier between the first power supply of the first digital audio chain and the merged power supply, and a second rectifier between the second power supply of the second digital audio chain and the merged power supply.

9. The digital audio system of claim 1, wherein the first digital audio chain and the second digital audio chain are carried over a common cable.

10. The digital audio system of claim 9, wherein the common cable includes a first twisted pair for the first digital audio chain and a second twisted pair for the second digital audio chain.

11. A method of providing digital audio connectivity, the method comprising:

connecting a plurality of audio nodes using a first digital audio chain, the plurality of audio nodes each associated with a corresponding audio device;

connecting the plurality of audio nodes using a second digital audio chain;

running the first digital audio chain and the second digital audio chain concurrently; and selecting one of the first digital audio chain or the second digital audio chain for audio connectivity using a controller of at least one of the plurality of audio nodes, wherein the first digital audio chain runs in a clockwise direction and the second digital audio chain runs in a counterclockwise direction.

12. The method of claim 11, wherein the first digital audio chain and the second digital audio chain are each an A2B daisy chain.

13. The method of claim 11, wherein the first digital audio chain is discovered in the clockwise direction and the second digital audio chain is discovered in the counterclockwise direction.

14. The method of claim 11, wherein the plurality of audio nodes includes a main audio node and two or more audio sub-nodes, wherein the first digital audio chain extends from the main node through the two or more audio sub-nodes, and wherein the second digital audio chain extends from the main node through the two or more audio sub-nodes.

15. The method of claim 14, further comprising selecting one of the first digital audio chain or the second digital audio chain for audio connectivity using a respective controller of each of the two or more audio sub-nodes.

16. The method of claim 11, further comprising using the controller to initially select the first digital audio chain for providing audio connectivity, and thereafter to transition from the first digital audio chain to the second digital audio chain in response to detecting a node failure in the first digital audio chain.

17. The method of claim 11, further comprising powering the at least one of the plurality of audio nodes using a merged power supply merged from a first power supply of the first digital audio chain and a second power supply of the second digital audio chain.

18. The method of claim 17, further comprising a first rectifier between the first power supply of the first digital audio chain and the merged power supply, and a second rectifier between the second power supply of the second digital audio chain and the merged power supply.

* * * * *